Figure 1:
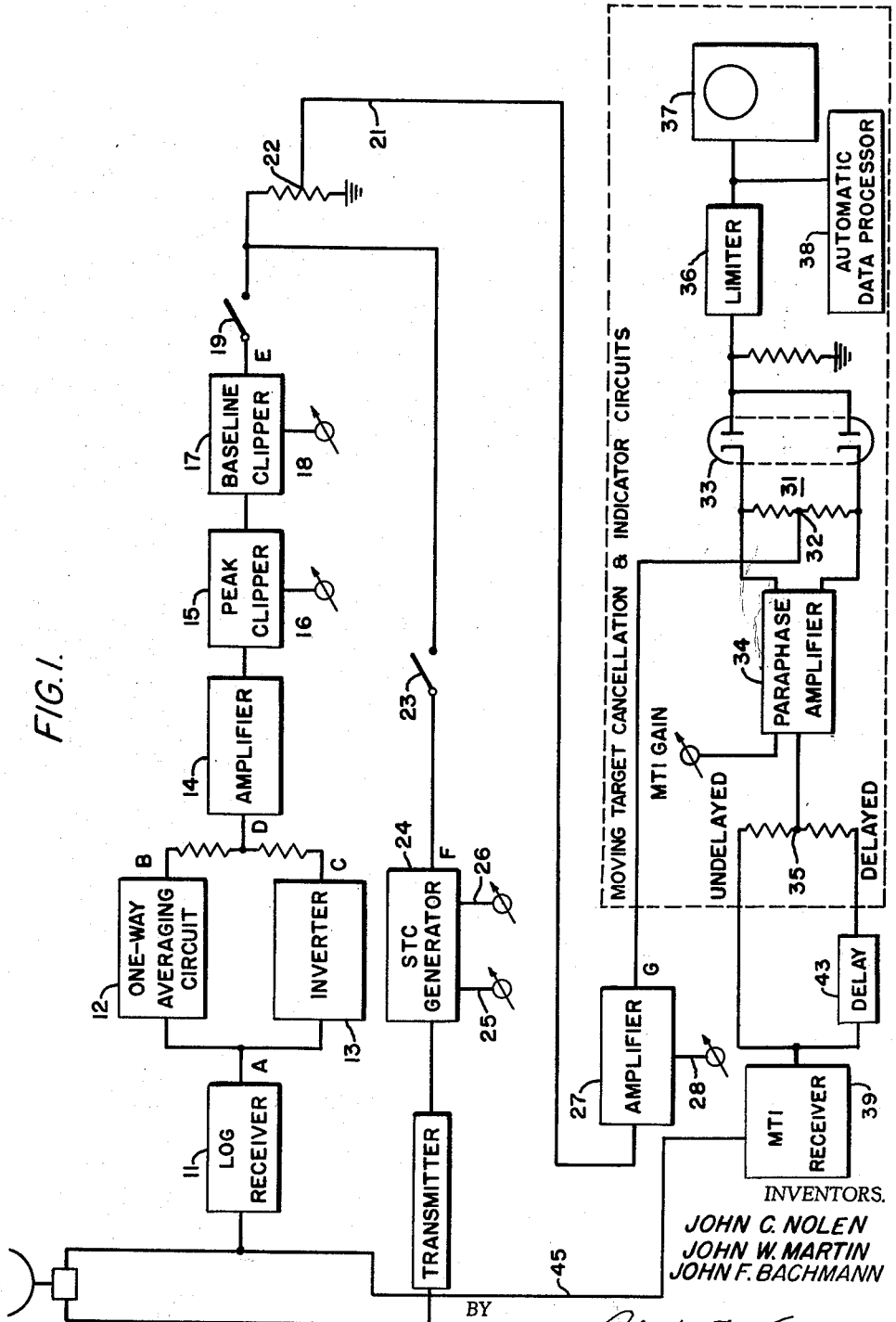

INVENTORS
JOHN C. NOLEN
JOHN W. MARTIN
JOHN F. BACHMANN

BY Robert J. Killman
ATTORNEY

United States Patent Office

3,176,293
Patented Mar. 30, 1965

3,176,293
INSTANTANEOUS THRESHOLD TIME CONTROL FOR ENHANCING DETECTION PROBABILITIES IN RADAR HAVING CLUTTER
John C. Nolen, John W. Martin, and John F. Bachmann, Baltimore County, Md., assignors to The Bendix Corporation, a corporation of Delaware
Filed Dec. 18, 1958, Ser. No. 781,255
9 Claims. (Cl. 343—7)

This invention relates to radar systems and more particularly to improvements in radar systems providing means for eliminating false target echoes from the indicator selected range portions of the display.

In long range search radar systems of the type currently in general use for early warning systems and aircraft surveillance the elimination of non-significant target indications and other responses from the cathode ray indicator and erroneous response in the data processing equipment are problems which have received considerable attention in the past. A generally accepted mode of operation for eliminating indicator responses due to unwanted signals is the moving target indicator (MTI) systems in which the video signals are processed to utilize the Doppler signal components therein and produce a display primarily activated by the response from targets which are moving relative to the radar system. Although the MTI system represents a distinct improvement over the conventional non-MTI system it is found in practice that the cancellation of returns from stationary targets is far from perfect and as a result the display indicator and data processor exhibit numerous responses due to clutter return and signals returned from unwanted targets, commonly referred to as ghosts and angels. In long range search radars operating at extremely high power levels the returns over the short range regions of coverage, for example in the neighborhood of zero to fifty miles, may be of such intensity and density as to result in the loss of echo signals from desired targets within this region. The difficulty in detecting true target returns such as those caused by aircraft as distinguished from false target returns such as those due to ghosts and angels in the short range regions of the radar where high clutter signals predominate is a serious limitation in present day radar systems. While sensitivity time control (STC) systems are known in which a variable bias voltage is applied to the amplifier channel of the radar receiver for varying the gain of the receiver as a function of time after the transmitted pulse, such systems are inherently undesirable since they reduce the detecting power of the receiver to such a level that many desirable target returns will be lost while the undesirable ones are being suppressed.

Accordingly, it is a primary object of the present invention to provide improved circuits for radar systems which result in improved detection and display of the radar information.

Another object of this invention is to provide improved circuits for radar systems for reducing the response due to unwanted signals while retaining responses from desirable target signals.

Further object of this invention is to improve the utility of radar systems for short ranges.

A still further object of this invention is to generate and apply variable signals to threshold circuits for a cathode ray indicator in a manner that discriminates against unwanted response while maintaining the desired responses.

Figure 2:
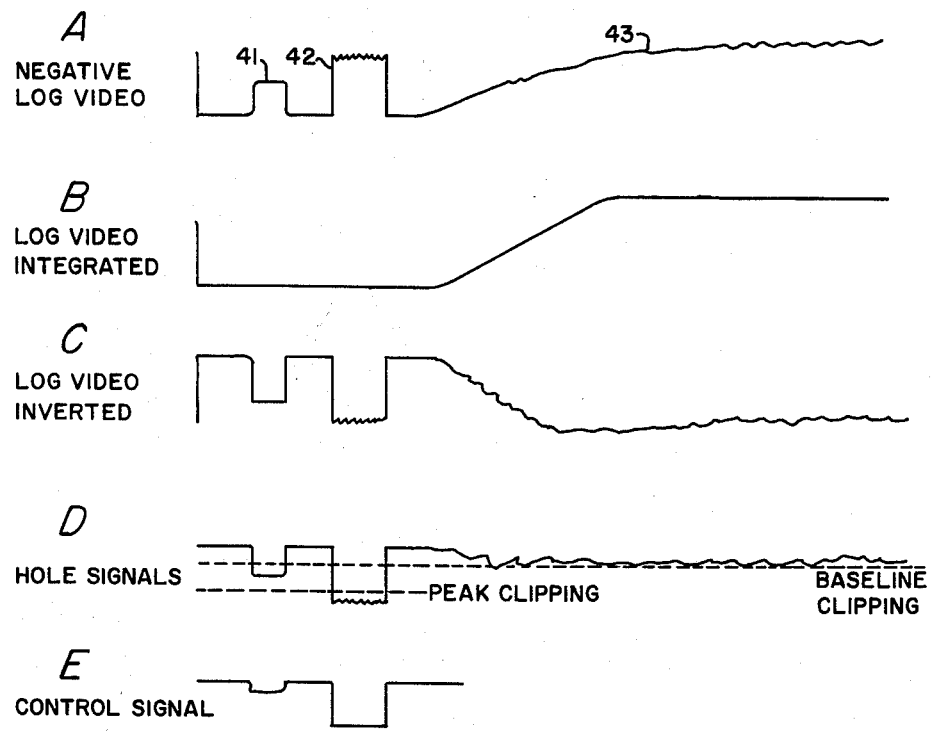
Figure 3:
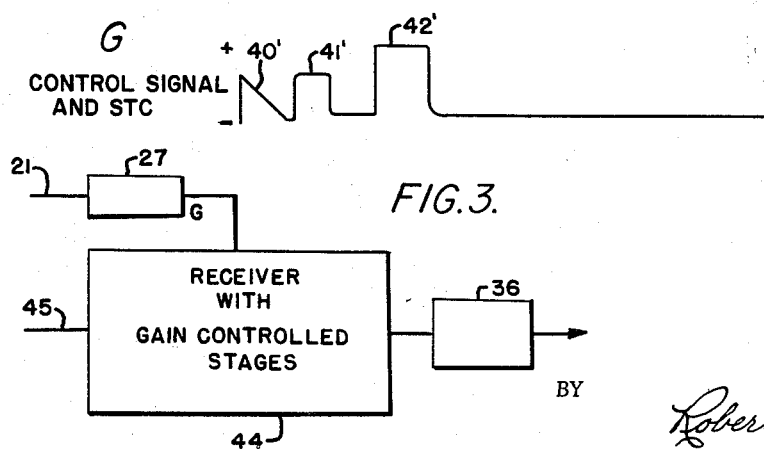

These and other objects of the present invention will be apparent from the following detailed description taken in conjunction with the accompanying drawing wherein:
FIG. 1 shows a block diagram of the circuit of the present invention as incorporated in the conventional MTI radar receiver;
FIG. 2 shows waveforms useful in understanding the operation of the invention; and
FIG. 3 is a partial block diagram showing modifications of the system of FIG. 1.

One disclosed embodiment of the present invention varies the response of a radar system by applying an instantaneous bias to the video circuits such that the indicator produces a visible response only for signals which are greater than the instantaneous baseline bias applied to the video channel. Where low level unwanted target signals are present, such as ghosts and angels, the circuit of the present invention may provide further circuits for selectively controlling the baseline bias of the video circuit in accordance with the clutter amplitude to suppress weak signals where holes in the clutter signal are present.

Referring now to FIG. 1 an MTI radar system is shown in which a logarithmic receiver 11 is employed with a radar system to develop non-limiting video signals for deriving control signals therefrom. The non-limiting video signal from the receiver 11 is applied to an averaging circuit 12 and an inverter circuit 13 which have their outputs combined at the input of an amplifier 14. The averaging circuit 12 provides a fast charging time and a slow discharge time such that the output of the circuit 12 rises quickly at the transmitted pulse of the radar and falls off slowly with the average clutter level as the clutter signals diminish in magnitude and density. (The difference in charging and discharging time constants is readily obtained in the averaging circuit 12 by including a unilateral diode in a position where its low forward resistance will be effective to determine the time constant during charging and its high back resistance will be similarly effective during discharging.) The difference signal obtained by subtraction between the average and unaveraged signals passed by the channels 12 and 13, respectively, is amplified by amplifier 14 and passed through a peak clipper 15 which has an adjustable means 16 for setting the clipping level and then through a baseline clipper 17 which also has means 18 for setting an adjustable baseline threshold level. The peak and baseline clipped signal from unit 17 is selectively connected by a switch 19 to an instantaneous threshold time control line 21 with adjustable magnitude obtained by means of potentiometer 22.

Also applied to the line 21 selectively through a switch 23 is a sensitivity time control signal generated by STC generator 24. The generator 24 may be of known type which responds to a trigger input corresponding to the transmitted signal to generate an exponential waveform which may be controlled by amplitude control 25 and time constant control 26 to produce a desired waveform which may be used to vary a characteristic of the receiver as a function of time after the transmitted pulse initiates the waveform.

Signals on line 21 are applied to an amplifier 27 which has a D.C. level control 28 to produce at the output thereof a threshold control bias. As shown in FIG. 1 this threshold control bias is applied to a full wave rectifier 31 by connection to a mid-point 32 on a resistance connection between the cathodes of detector tubes 33. The cathodes of the detector 33 are driven by a paraphase amplifier 34 which applies phase opposed signals thereto representative of the difference between the delayed and undelayed MTI signals which are combined in input circuit 35.

The signals applied to the imput circuit 35 are obtained from an MTI receiver 39 which has applied thereto as input signals via line 45 the intermediate frequency signals derived from the radar antenna. The receiver 39 includes a delay device 43 for delaying signals by one pulse repetition period in accordance with well known MTI techniques. The addition in input circuit 35 takes place with the proper polarity for cancelling fixed target signals and thus provides the remaining signals from moving targets to the amplifier 34. The detection of the phase opposed signals from the output of the amplifier 34 in the full wave rectifier 31 produces the MTI video signal which passes through a limited amplifier 36 and then to a cathode ray indicator 37 and automatic data processing equipment 38.

The principles and operation of the present invention can be explained by reference to FIG. 2 showing various waveform diagrams present in the system of FIG. 1 at correspondingly lettered points. FIG. 2A shows a typical signal obtained from a logarithmic amplifying channel of a radar receiver. The signal is of negative polarity and exhibits a large negative amplitude immediately after the transmission of the transmitted pulse due to the high intensity signals received by the receiver from nearby clutter reflectors. The clutter return signal will, in general, be characterized by holes 41, 42 which represent ranges in the radar coverage from which only low level or no clutter returns are received. Beyond the near range of the radar, for example beyond fifty miles, the log video signal will contain a reduced amount of clutter and the signal will return to a nominal baseline level 43. The effect of a signal such as shown in FIG. 2A on the visual presentation of the cathode ray indicator 37 and response of the data processor 38 is such that weak signals from unwanted targets may be detected for ranges corresponding to the holes 41, 42 as though they were moving target signals from aircraft or other desirable target returns. The visual discrimination between such signals in the high clutter short range region of the radar end signals from actual aircraft, which it is imperative not to be overlooked, it is difficult due to the general confusion presented on the cathode ray display due to the immersion of both types of signals in the random clutter signals displayed.

Applicants have found that an instantaneous control signal can be employed to improve the operation of radar systems. For example, by controlling the threshold level of the cathode ray indicator instantaneously in accordance with the holes in the clutter signal the threshold for display of target returns can be adjusted to a level which results in the display of returns from aircraft since they are relatively strong and the suppression of display of moving target signals such as ghosts or angels since these signals are comparatively weak. Accordingly, applicants' circuit of FIG. 1 is adapted to utilize the signals 41, 42 for modifying the threshold of detectability in circumstances where a high clutter signal with holes is present. To this end the signal of FIG. 2A is averaged in the circuit 12 to produce the signal of FIG. 2B and the signal of FIG. 2A is inverted in the inverter circuit 13 to produce the signal of FIG. 2C. The combination of these opposite polarity signals takes place at the input of the amplifier 14 to produce the waveform of FIG. 2D which may be considered as the hole signals separated from the total clutter signal. The signal D passing through the peak clipper 15 and the baseline clipper 17 is transformed into a baseline and peak clipped signal as shown in FIG. 2E. The signal of FIG. 2E and the exponential sensitivity time control signal 40 of FIG. 2F are combined in the amplifier 27 to produce the composite signal of FIG. 2G for the condition of both switches 23 and 19 being closed. For both switches 19, 23 closed, the wave G will provide an exponential portion 40' and processed hole signals 41', 42'. The application of the signal G to the rectifier 31 as hereinbefore described produces a relatively high threshold level for the range time corresponding to the holes 41, 42 of signal A whereby the relatively weak signals from unwanted moving targets are suppressed and not effective to produce an indication on the cathode ray tube 37 or response in the device 38.

By actual operation it has been observed that the application of the present invention as herein described to an operating radar permits the observation of aircraft signals in the clutter region with greatly improved clarity and reliability over that obtained from the same radar system operating without the circuit of the present invention. This result is achieved without affecting the sensitivity of the radar system or the sub-clutter visibility in heavy clutter regions. Returns from unwanted targets such as angels and ghosts do not appear in high clutter regions because the amplitude of such signals is far below the clutter level even though their speed may be between one-half to optimum speed for the MTI receiver sensitivity. In a system which may conventionally have a sub-clutter visibility of 30 db the instantaneous bias application to the threshold of the cathode ray indicator should be adjusted to be applied whenever the ratio of unwanted target strength to clutter level is greater than the 30 db sub-clutter visibility level. The magnitude of the instantaneous bias that is applied to the indicator threshold can be adjusted to a level such that strong target returns, such as obtained from aircraft, will overcome the threshold and appear on the display. In situations such as locations over water where the clutter is low and the returns from unwanted moving targets are numerous the system may be operated with switch 19 open and switch 23 closed to apply a time varying bias of predetermined waveform to establish the threshold level of the rectifier 31. By the proper control of the amplitude and time constant of this waveform as well as the D.C. level of the bias signal controlled by means 28 an improvement in the detectability of true targets can be effected since the threshold of visibility on the cathode ray indicator may be adjusted to suppress weak signals from unwanted targets.

A second embodiment of the invention is shown in FIG. 3. This fragmentary diagram is part of a circuit which is essentially the same as that shown in FIG. 1, except for the portion connected between lead 45 and the amplifier-limiter 36. The alternative construction includes any form of radar receiver 44 having one or more gain controlled stages responsive to a control signal. To these stages is applied the control wave G with the correct polarity to reduce the gain of the receiver for the more positive regions of the signals 40', 41', 42'. This arrangement provides a marked improvement in reliably detecting true targets over that offered by the use of STC techniques alone.

The application of the principles of the present invention will now be obvious to information processing systems generally and modifications to this end are to be considered within the scope of the invention as refined by the appended claims.

We claim:

1. An object locating system comprising means for transmitting perodic pulse signals and receiving signals returned from surrounding objects, a utilization device responsive to said returned signals, means for generating a control signal synchronized with said pulse signals and having magnitude values between predetermined limits corresponding to the received instantaneous clutter signal level, a sensitivity-time control wave generator synchronized with said pulse signals, means for combining said control signal and said sensitivity-time control wave, and means for altering the response sensitivity of said device in accordance with the instantaneous combined values of said control signal and said wave.

2. An object locating system comprising means for transmitting periodic pulse signals and receiving signals returned from surrounding objects, means for developing amplitude varying signals corresponding to the phase varying signals reflected from moving objects, an amplitude detector circuit for converting said amplitude varying signals into video signals, a data processing device utilizing said video signals of predetermined magnitude, means for generating a control signal synchronized with said pulse signals and having magnitude values between predetermined limits corresponding to the instantaneous clutter signal level for each pulse period, a sensitivity-time control wave generator synchronized with said pulse signals, means for combining said control signal and said sensitivity-time control wave, and means for altering the received signal level sensitivity of said device in accordance with the instantaneous combined values of said control signal and said wave.

3. An object locating system comprising means for transmitting periodic pulse signals and receiving signals returned from surrounding objects, means for developing amplitude varying signals corresponding to the phase varying signals reflected from moving objects, an amplitude detector circuit for converting said amplitude varying signals into video signals, a data processing device utilizing said video signals of predetermined magnitude, means for generating a control signal synchronized with said pulse signals and having magnitude values between predetermined limits corresponding to the instantaneous clutter signal level for each pulse period, and means for altering the received signal level sensitivity of said device in accordance with said control signal.

4. An object locating system comprising means for transmitting periodic pulse signals and receiving signals returned from surrounding objects, a cathode ray indicator having a range sweep synchronized with said pulse signals for displaying said returned signals, means for generating a control signal synchronized with said range sweep and having magnitude values between predetermined limits corresponding to the instantaneous clutter signal level for each range sweep, a sensitivity-time control wave generator synchronized with said pulse signals, means for combining said control signal and said sensitivity-time control wave, and means for altering the threshold of visibility signal level of said indicator in accordance with the instantaneous combined values of said control signal and said wave.

5. An object locating system comprising means for transmitting periodic pulse signals and receiving signals returned from surrounding objects, means for developing amplitude varying signals corresponding to the phase varying signals reflected from moving objects, an amplitude detector circuit for converting said amplitude varying signals into video signals, a cathode ray indicator having a range sweep synchronized with said pulse signals for displaying said video signals, means for generating a control signal synchronized with said range sweep and having magnitude values between predetermined limits corresponding to the instantaneous clutter signal level for each range sweep, a sensitivity-time control wave generator synchronized with said pulse signals, means for combining said control signal and said sensitivity-time control wave, and means for altering the threshold of visibility signal level of said indicator in accordance with the instantaneous combined values of said control signal and said wave.

6. An object locating system comprising means for transmitting periodic pulse signals and receiving signals returned from surrounding objects, means for developing amplitude varying signals corresponding to the phase varying signals reflected from moving objects, an amplitude detector circuit for converting said amplitude varying signals into video signals, a cathode ray indicator having a range sweep synchronized with said pulse signals for displaying said video signals, means for generating a control signal synchronized with said range sweep and having magnitude values between predetermined limits corresponding to the instantaneous clutter signal level for each range sweep, and means for altering the threshold of visibility signal level of said indicator in accordance with said control signal.

7. An object locating system comprising means for transmitting periodic pulse signals and receiving signals returned from surrounding objects, means for developing amplitude varying signals corresponding to the phase varying signals reflected from moving objects, an amplitude detector circuit for converting said amplitude varying signals into video signals, a cathode ray indicator having a range sweep synchronized with said pulse signals for displaying said video signals, a sensitivity-time control wave generator synchronized with said pulse signals, and means for altering the threshold of visibility signal level of said indicator in accordance with said wave.

8. An object locating system comprising means for transmitting periodic pulse signals and receiving signals returned from surrounding objects, means for developing amplitude varying signals corresponding to the phase varying signals reflected from moving objects, an amplitude detector circuit for converting said amplitude varying signals into video signals, a cathode ray indicator having a range sweep synchronized with said pulse signals for displaying said video signals, means for generating a control signal synchronized with said range sweep and having magnitude values between predetermined limits corresponding to the instantaneous clutter signal level for each range sweep, a sensitivity-time control generator synchronized with said pulse signals, means for combining said control signal and said sensitivity-time control wave, and means for back-biasing said amplitude detector in accordance with the instantaneous combined values of said control signal and said wave to alter the detection threshold for said amplitude varying signals.

9. An object locating system comprising means for transmitting periodic pulse signals and receiving signals returned from surrounding objects, means for developing amplitude varying signals corresponding to the phase varying signals reflected from moving objects, an amplitude detector circuit for converting said amplitude varying signals into video signals, a cathode ray indicator having a range sweep synchronized with said pulse signals for displaying said video signals, means for generating a control signal synchronized with said range sweep and having magnitude values betwen predetermined limits corresponding to the instantaneous clutter signal level for each range sweep, and means for back-biasing said amplitude detector in accordance with said control signal to alter the detection threshold for said amplitude varying signals.

References Cited in the file of this patent
UNITED STATES PATENTS

| | | |
|---|---|---|
| 2,411,572 | Hershberger | Nov. 26, 1946 |
| 2,422,334 | Bedford | June 17, 1947 |
| 2,583,173 | Hargens | Jan. 22, 1952 |
| 2,602,922 | Maynard | July 8, 1952 |
| 2,798,949 | Scholz | July 9, 1957 |
| 2,910,692 | MacKiernan | Oct. 27, 1959 |
| 3,115,629 | Plaistowe et al. | Dec. 24, 1963 |